United States Patent [19]

Knoblauch et al.

[11] Patent Number: 4,477,052

[45] Date of Patent: Oct. 16, 1984

[54] GATE VALVE

[75] Inventors: Karl Knoblauch; Heinrich Heimbach, both of Essen, Fed. Rep. of Germany

[73] Assignee: Bergwerksverband GmbH, Essen, Fed. Rep. of Germany

[21] Appl. No.: 476,683

[22] Filed: Mar. 18, 1983

[51] Int. Cl.³ .............................................. F16K 31/12
[52] U.S. Cl. ........................................... 251/57; 92/90
[58] Field of Search ................ 251/57, 61.1, 62, 175, 251/5; 92/90

[56] References Cited

U.S. PATENT DOCUMENTS

| | | | |
|---|---|---|---|
| 2,406,899 | 9/1946 | Pugh et al. | 251/57 |
| 2,426,212 | 8/1947 | Hedene | 251/57 |
| 2,825,528 | 3/1958 | Truitt | 251/175 |
| 3,301,522 | 1/1967 | Ashbrook | 251/57 |
| 3,380,470 | 4/1968 | Culpepper | 251/57 |
| 4,043,533 | 8/1977 | Cowley | 251/57 |
| 4,320,778 | 3/1982 | Baumann | 251/57 |
| 4,322,055 | 3/1982 | Baumann | 251/57 |

FOREIGN PATENT DOCUMENTS 1058802 10/1959 Fed. Rep. of Germany .
2601120 7/1977 Fed. Rep. of Germany .

Primary Examiner—Daniel J. O'Connor
Attorney, Agent, or Firm—Karl F. Ross; Herbert Dubno

[57] ABSTRACT

A gate valve for selectively blocking and unblocking a flow path has a valve body filled with hydraulic liquid and provided with a pair of shutters displaceable by fluid pressure against respective seating surfaces of a valve housing. The valve body is shiftable between a blocking position, in which the shutters are aligned with their seating surfaces, and an unblocking position by means of a plunger projecting into the hollow body in a fluidtight manner but with freedom of relative displacement in the shifting direction. In a valve-closing stroke, the plunger pushes that body into its blocking position solely via the confined liquid; when the body is arrested in that position by a stop, the continuing plunger stroke displaces the liquid to press the shutters onto their seats against a biasing force such as that of elastic membranes holding them onto the body. In a valve-opening stroke, the receding plunger hydraulically withdraws the shutters from their seats and then retracts the valve body into its unblocking position.

7 Claims, 4 Drawing Figures

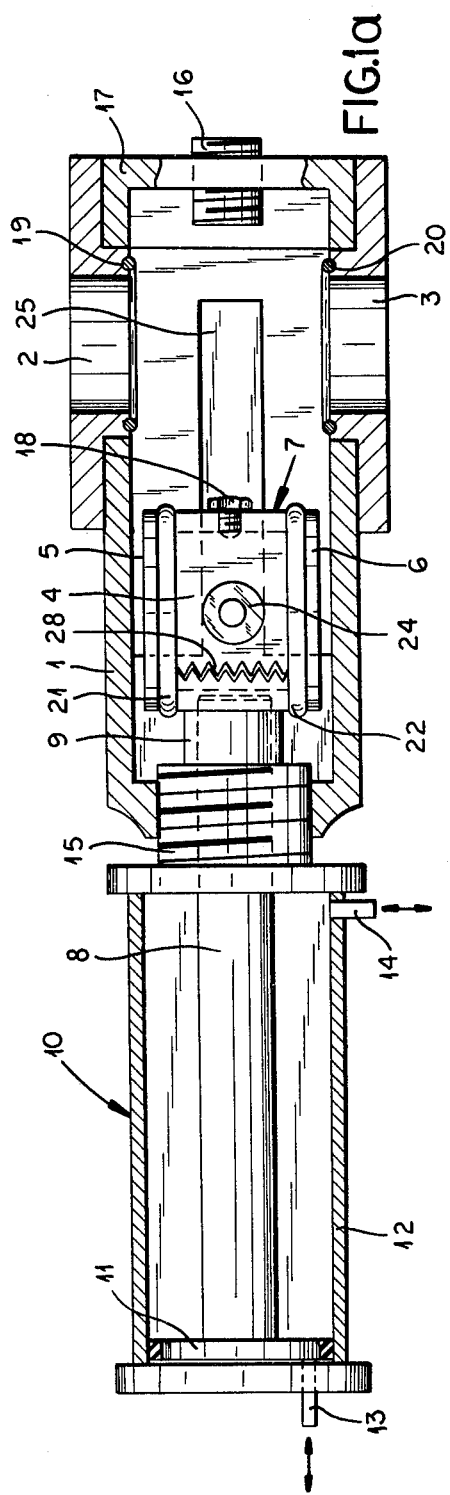
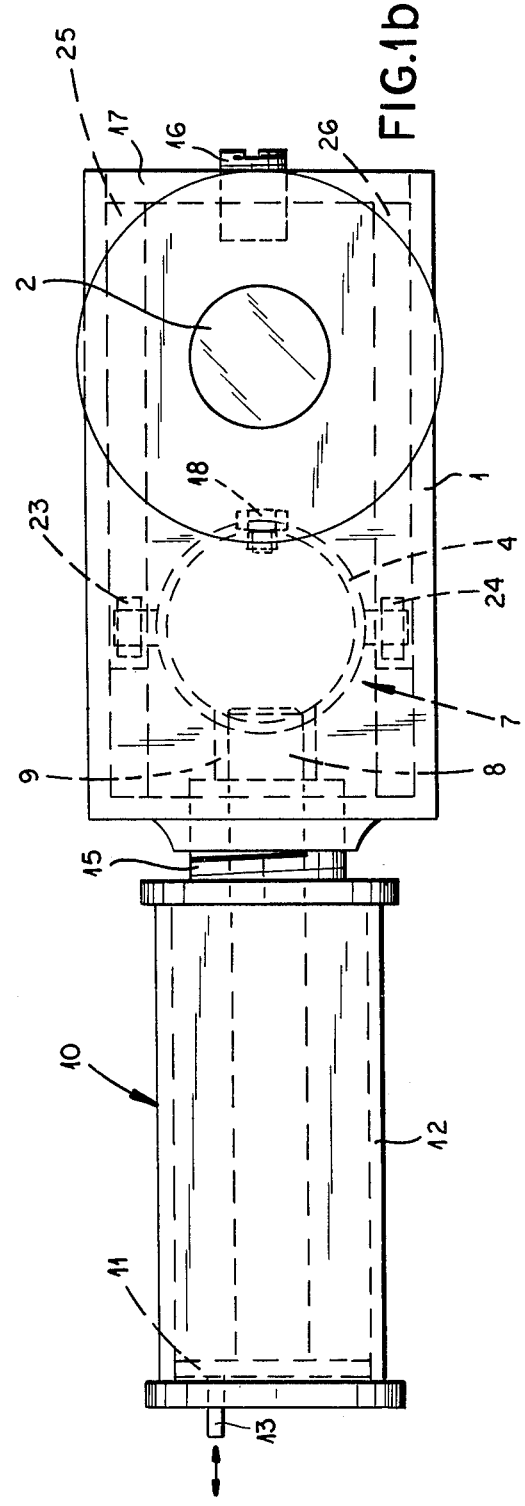

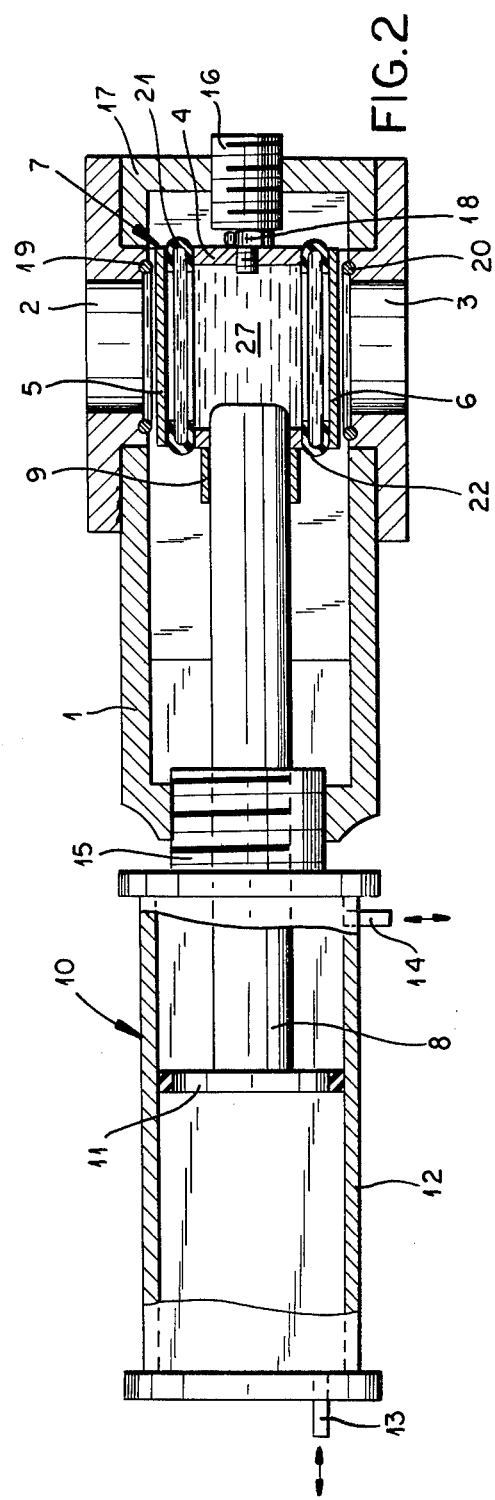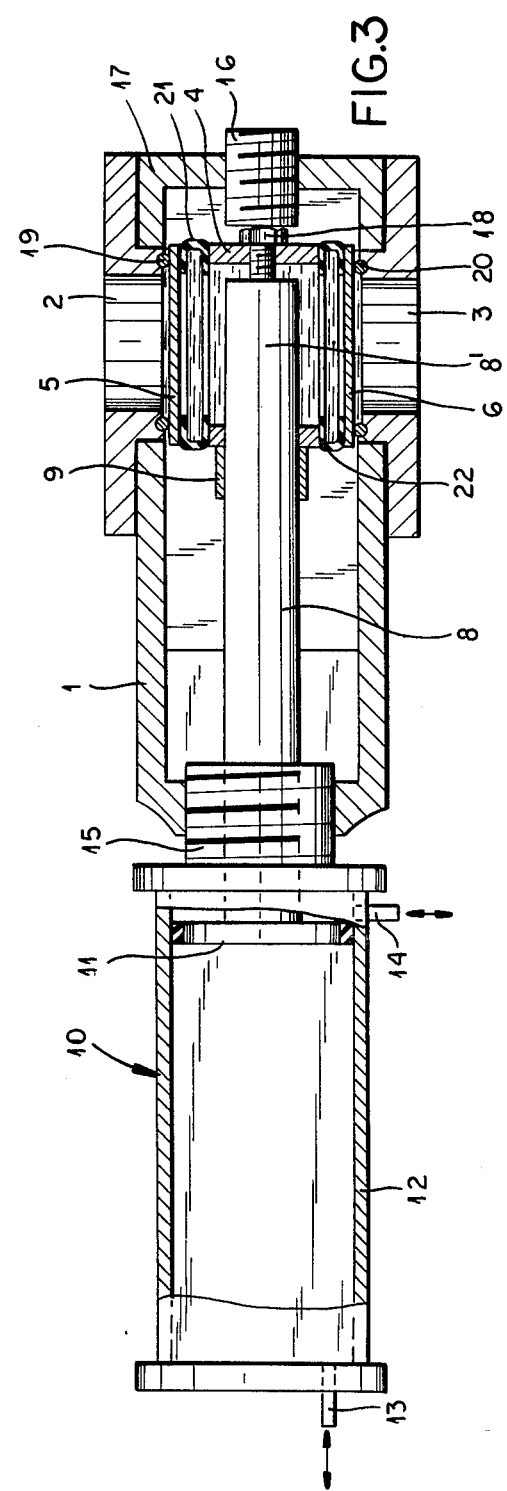

GATE VALVE

FIELD OF THE INVENTION

Our present invention relates to a gate valve for the selective blocking and unblocking of a flow path with the aid of a valve body which has at least one shutter member confronting an aperture of that flow path in a blocking position, this shutter member being fluidically displaceable into sealing engagement with a seating surface surrounding the confronting aperture.

BACKGROUND OF THE INVENTION

A gate valve of the type referred to, whose housing has two aligned apertures forming part of the flow path to be selectively blocked, has been described in U.S. Pat. No. 2,825,528. According to that patent, a valve body forms a cylinder containing a hydraulic liquid and has a pair of disks removably secured to it by circular bellows so that they are outwardly displaceable by hydraulic pressure, against the force of biasing springs, into contact with respective seat rings surrounding the associated apertures. The valve body is engaged by a threaded stem which can be manually reciprocated, with the aid of a handwheel, to thrust that body into its blocking position through the intermediary of a compressible coil spring. When the valve body strikes a stop defining its blocking position, further rotation of the handwheel advances the stem to compress the coil spring while an extremity of the stem enters the cylinder to displace the hydraulic liquid therein which then drives the two disks into contact with the associated seat rings. When the valve is to be opened, the handwheel is rotated in reverse to retract the stem whereupon the biasing springs withdraw the disks from their seat rings; thereafter, further rotation of the handwheel retracts the disengaged valve body into an unblocking position away from the flow path. Naturally, the force exerted upon the stem during the closure stroke must be sufficient to overcome the reactions of the coil spring and of the biasing springs.

A considerably simpler arrangement, in which the valve body is a frustoconical plug and is rigid with its reciprocable stem, is known from German printed specification No. 1,058,802 published June 4, 1958. The plug is unitary and not provided with separately movable shutter members, being thus only able to control a flow in a transverse pipe provided with aligned holes of different diameters closely surrounding that plug in its inserted position.

From commonly owned German laid-open application No. 26 01 120, published July 28, 1977, it is further known to provide the body of a gate valve with two mechanically separable shutter members interconnected by a scissor linkage. A spreader reciprocable in the valve housing is coupled via a compression spring with an operating rod which during a closure stroke drives the valve body into a blocking position and thereupon actuates the spreader to let the scissor linkage force the two shutter members into contact with associated sealing rings.

OBJECT OF THE INVENTION

The object of our present invention is to provide an improved gate valve whose mode of operation basically corresponds to that of the above-identified U.S. patent but which operates more rapidly, is of simpler construction and needs only a relatively small force for opening and closure.

SUMMARY OF THE INVENTION

We realize this object, in accordance with the present invention, by the provision of a reciprocable plunger which slidably extends in a fluidtight manner into a hollow valve body equipped with at least one fluidically displaceable shutter member, this plunger being mechanically decoupled from the valve body while coacting with the fluid confined therein. In a valve-closing stroke, the plunger drives the valve body into its blocking position virtually exclusively through the intermediary of the confined fluid, thus without the aid of any interposed spring or other mechanical coupler, and its continuing thrust after the arresting of that body in this position displaces the confined fluid to press the shutter member or members into firm contact with a seating surface or a pair of such surfaces confronted thereby. A reverse motion of the plunger enables a withdrawal of each shutter member from its seating surface prior to retraction of the valve body, again through the intermediary of the confined fluid, from the blocking position into an unblocking position; such withdrawal can be facilitated by biasing means opposing a displacement of each shutter member toward the corresponding seating surface.

Advantageously, pursuant to a more particular feature of our invention, the valve body forms a cylindrical fluid chamber which is centered on an axis perpendicular to the direction of plunger reciprocation and of a diameter exceeding that of the plunger whereby the latter projects with all-around peripheral clearance into the fluid chamber so as to be movable therein without any significant frictional resistance. When the plunger is perfectly cylindrical, the fractional relationship between its own diameter and that of the fluid chamber reduces the fluid pressure axially exerted upon it by the biasing force so that the inserted position of the plunger may be maintained to hold the valve closed even if the operating force driving that plunger forward should be diminished for any reason. This property enables us to use a simple fluidic jack with a double-acting piston as an actuator instead of having to rely on a self-locking coupling such as the threaded connection of a stem and a handwheel according to the above-cited U.S. patent. The plunger, in that case, may simply be an extension of the piston rod of the jack.

BRIEF DESCRIPTION OF THE DRAWING

The above and other features of our invention will now be described in detail with reference to the accompanying drawing in which:

FIG. 1a is a sectional plan view of a gate valve embodying our invention, shown in an unblocking position;

FIG. 1b is an elevational view of the assembly of FIG. 1a, shown in the same position;

FIG. 2 is a view similar to that of FIG. 1a, showing the valve in its blocking position but prior to shutter closure; and FIG. 3 is another view similar to that of FIG. 1a but showing the valve in sealing position.

SPECIFIC DESCRIPTION

As shown in the drawing, a gate valve according to our invention comprises a prismatic housing 1 whose interior communicates with two adjoining spaces, forming part of a flow path, via a pair of coaxially aligned apertures 2 and 3. A valve body, generally designated 7, comprises a hollow cylinder 4 whose axis is parallel to that of apertures 2,3 and whose interior is filled with a working fluid 27, preferably a hydraulic liquid such as oil. Cylinder 4 is bounded at its end by two independently movable shutter members in the form of disks 5 and 6 which are attached to the cylinder wall by resilient membranes 21, 22 enabling their limited relative axial separation under pressure of the confined liquid. Such separation is resisted by a biasing force which includes the elasticity of membranes 21, 22 and may be supplemented by the contractile force of one or more tension springs, one such spring being illustrated in FIG. 1a at 28. A nipple 9 forms a fluidtight guide for a plunger 8' represented by an extremity of a piston rod 8 projecting from an actuator 10 in the form of a pneumatic or hydraulic jack. The latter comprises a cylinder 12 with a double-acting piston head 11 secured to rod 8, piston 8, 11 being reciprocable by a pneumatic or hydraulic operating fluid alternatively admitted through one of two ports 13, 14 and discharged from the respective other port. This actuator 10, secured to valve housing 1 by a threaded sleeve 15, is thus able to displace the piston rod 8 in the direction of its length which is perpendicular to the axis of apertures 2,3.

In FIGS. 1a and 1b we have shown the piston head 11 fully retracted whereby valve body 7 is lodged within housing 1 in an unblocking position remote from the flow path defined by the apertures 2, 3. When pressure fluid is admitted into cylinder 12 via port 13, piston head 11 shifts to the right into an intermediate position illustrated in FIG. 2 while its plunger-forming end 8' displaces the valve body 7 into a blocking position in which these apertures are coaxial with cylinder 4.

Since no positive or yieldable mechanical connection exists between plunger 8' and valve body 7, aside from the low-friction sliding contact between rod 8 and nipple 9, the entrainment of the valve body by the advancing piston rod into the position of FIG. 2 occurs virtually exclusively through the intermediary of the confined liquid. Valve body 7, guided by a pair of rollers 23, 24 in tracks 25, 26 on opposite walls of housing 1, also encounters little resistance against such entrainment. Thus, the advance of piston 8, 11 from the retracted position of FIGS. 1a and 1b into the intermediate position of FIG. 2 lets the plunger 8' penetrate only slightly into the interior of cylinder 4 whereby shutter disks 5 and 6 are displaced only to a minor extent from their quiescent positions.

An adjustable end stop 16, threaded into a removable lid 17 at the end of housing 1 remote from cylinder 12, arrests the valve body in the position of FIG. 2 by coming into contact with a screw 18 which penetrates the wall of cylinder 4 to serve as an adjustable abutment limiting the penetration of plunger 8'. With the valve body thus immobilized, the continuing advance of piston head 11 under fluid pressure into the position of FIG. 3 forces the plunger 8' deeper into the interior of cylinder 4 where that plunger is entirely enveloped by the hydraulic liquid 27 confined therein. In displacing this liquid by its advance, the plunger 8' drives the shutter disks 5 and 6 apart against their biasing force and urges them into firm contact with a pair of elastic sealing rings 19 and 20 forming respective seating surfaces around apertures 2 and 3.

Since the diameter and the cross-sectional area of plunger 8' are considerably less than those of the disks 5 and 6, the driving force applied by piston head 11 is translated into a substantially magnified axial thrust exerted by the hydraulic liquid 27. Conversely, the biasing force resisting the axial expansion of the fluid space will be only limitedly effective in tending to repress the piston 8,11. thus, even a considerable diminution of the applied driving force will hold the disks 5, 6 in their closure positions to enhance the operational reliability of our improved valve; this applies, of course, also to any external fluid pressure exerted upon disk 5 or 6 by way of aperture 2 or 3. If screw 18 were replaced by a larger abutment similar to stop 16, designed to overlie completely the end face of plunger 8' in the terminal position of FIG. 3, this position would be entirely stable. With the arrangement actually shown, in which the screw 18 obstructs only a minor portion of that end face, the biasing force could be so chosen as to return the valve to the "cracked" position of FIG. 2 when the fluid pressure on opposite sides of piston head 11 is equalized; the pressure of an external fluid entering the housing through aperture 2 or 3 could then force the valve completely open.

It is also possible, with suitable adjustment of stop 16, to clamp the valve body 7 in terminal positions in which the apertures 2 and 3 are obstructed only in part.

Even in the absence of a biasing force tending to detach the disks 5, 6 from their seating surfaces formed by rings 19, 20, such detachment will be hydraulically performed by a sufficient retraction of rod 8 from the extended position of FIG. 3 as long as there are no significant gas pockets in the fluid chamber of cylinder 4.

It will further be apparent that piston 8, 11 could also be provided with springs designed to establish a desired plunger position in the event that the supply of operating fluid should fail.

The term "mechanically decoupled", as used with reference to plunger 8' and valve body 7, pertains only to the range of relative motion between the positions of FIGS. 1a and 3. This term, therefore, is not intended to exclude the possible provision of a one-way detent (e.g. a cross-pin) which prevents the complete extraction of rod 8 from nipple 9 in the event of, say, leakage of oil from the fluid chamber.

If the substance flowing through apertures 2 and 3 in the open position of the valve is a fluid other than air, housing 1 will of course have to be fully sealed against the atmosphere when lid 17 is in place.

We claim:

1. In a gate valve including a housing with an aperture forming part of a throughgoing flow path, a hollow valve body in said housing shiftable between a blocking position aligned with said aperture and an unblocking position away from said flow path, and shutter means on said valve body displaceable in said blocking position into sealing engagement with a seating surface around said aperture by pressure of a fluid confined in said valve body, the combination therewith of a plunger slidably extending in a fluidtight manner into said valve body for coaction with the fluid confined therein, said plunger being reciprocable in mechanically decoupled relationship with said valve body for driving same from said unblocking position into said blocking position virtually exclusively through the intermediary of the confined fluid, said housing being provided with stop means for arresting said valve body in said blocking position whereupon a continuing thrust of said plunger displaces the confined fluid to press said shutter means into firm contact with said seating surface, a reverse motion of said plunger enabling withdrawal of said shutter means from said seating surface prior to retraction of said valve body from said blocking position through the intermediary of the confined fluid.

2. The combination defined in claim 1 wherein said flow path includes two confronting apertures in said housing, said shutter means comprising two independently movable shutter members respectively confronting said apertures in said blocking position for sealing engagement with seating surfaces respectively surrounding same.

3. The combination defined in claim 2 wherein said shutter members are provided with biasing means opposing a displacement thereof toward said seating surfaces.

4. The combination defined in claim 3 wherein said shutter members are disks connected with said valve body by elastic membranes forming part of said biasing means.

5. The combination defined in claim 2 wherein said plunger is cylindrical and said valve body forms a cylindrical fluid chamber centered on an axis perpendicular to the direction of reciprocation of said plunger and of a diameter larger than that of said plunger whereby the latter projects with all-around peripheral clearance into said chamber, said shutter members being disks perpendicular to said axis.

6. The combination defined in claim 1 wherein said valve body is provided with an adjustable internal abutment for arresting said plunger in a limiting position of insertion.

7. The combination defined in claim 1 wherein said housing is provided with an extension forming a cylinder having a piston fluidically reciprocable therein, said plunger being secured to said piston.

* * * * *